Jan. 26, 1971  F. SCHULTZ  3,558,773
CRYSTALLINE KALLIKREIN-INACTIVATOR AND PROCESS
FOR PREPARING THE SAME
Filed Feb. 21, 1967  3 Sheets-Sheet 1

INVENTOR.
FRITZ SCHULTZ
BY
McCarthy, DePaoli & O'Brien
ATTORNEYS

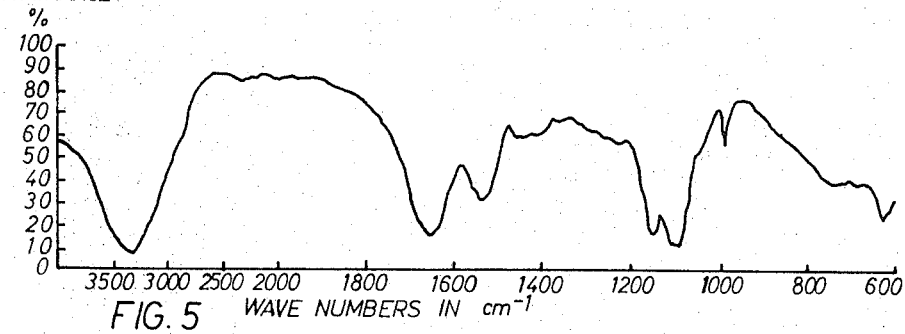

United States Patent Office 3,558,773
Patented Jan. 26, 1971

3,558,773
CRYSTALLINE KALLIKREIN-INACTIVATOR AND PROCESS FOR PREPARING THE SAME
Fritz Schultz, Wuppertal-Sonnborn, Germany, assignor to Farbenfabriken Bayer Aktiengesellschaft, Leverkusen, Germany, a corporation of Germany
Filed Feb. 21, 1967, Ser. No. 617,652
Claims priority, application Germany, Feb. 23, 1966, F 48,504
Int. Cl. A61k *17/00, 27/00*
U.S. Cl. 424—177
7 Claims

ABSTRACT OF THE DISCLOSURE

Substantially pure crystalline kallikrein-inactivator is provided which is essentially free from amorphous material and inorganic salts. Such crystalline substance is distinguished from the previously obtained crystalline material which is impure. A method for obtaining the crystals is provided wherein an aqueous solution of KI preparation is adjusted to pH above 9 and the substance crystallized therefrom. The crystalline KI permits the reversible inactivation of tryspin, chymotrypsins, fibrinolysin (plasmin) and kallikrein. Pharmaceutical compositions containing the crystalline substance are likewise provided. They are active as anti-fibrinolytic agents.

---

Figure 1:
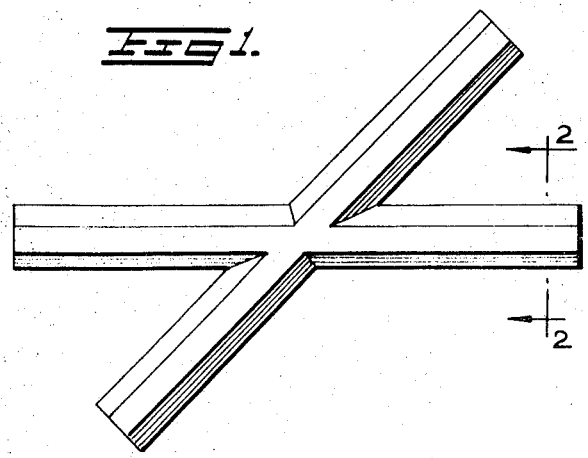

The present invention relates to novel, substantially pure crystalline kallikrien-inactivator and to the method for obtaining the crystalline material.

Kallikrein is a physiologically active principal which simultaneously causes a decrease of the blood pressure and an increase of the blood circulation of the lungs, brain, skin and muscles. The mechanism by which kallikrien acts has been found to be a proteolytic process.

Kallikrein-inactivator (KI) is a distinct and different chemical substance which inhibits the activity of kallikrein as well as certain other protein-cleaving enzymes. The substance is found in the organs of animals and, in particular, the lung, the lymph glands and the parotid glands as well as in the pancreas, liver, spleen and in the blood. KI was first prepared by H. Kraut, E. K. Frey and E. Werle by extracting certain dried organs of mammals with water or dilute acetic acid and precipitating the inactivator from these extracts by the addition of ethanol.

Additional methods for the preparation of kallikrein-inactivator are known in the art which involve the isolation of the inactivator from the previously indicated source materials. In this respect there may be mentioned the method which is disclosed in U.S. Pat. No. 2,890,986. This process involves the extraction of animal organs with dilute acid aqueous ethanol, concentrating the extract in vacuo, extracting the concentrated extract to remove impurities from the aqueous phase, adding an organic solvent miscible with water to the aqueous phase to precipitate the kallikrein-inactivator, dissolving the recovered precipitate in dilute acetic acid, adjusting the solution obtained to a pH of 7.5 to 8.5 and removing the precipitated impurities therefrom. Following this latter removal step an organic solvent miscible with water is again added to precipitate the inactivator and the inactivator is then recovered as the dry powder.

Additional processes for the preparation of relatively pure solutions of kallikrein-inactivator are disclosed in U.S. Pat No. 3,181,997. In respect to these known methods for preparing KI, there may also be mentioned the process for preparing the relatively pure KI through the use of metaphosphoric acid or its water-soluble salts to form a sparingly soluble precipitate followed by treatment of the precipitate to obtain the readily water-soluble inactivator substance having a purity level of from about 0.16 to 0.19 μg./KIU.

The kallikrein-inactivator material present in solution obtainable by the previously known processes was indicated to be a polypeptide having a molecular weight of 11,000 to 12,000. It was believed to contain sixteen different amino acids and to have as an N-terminal amino acid group, arginine, and as C-terminal group, alanine. These solutions were indicated to not be stable against alkali. At lower temperatures they were indicated to be stable for a few hours up to a pH value of about 9.

It has recently been found that pure kallikrein-inactivator is a polypeptide having an approximate molecular weight of 6,500. It contains sixteen different amino-acids in a chain consisting altogether of fifty-eight amino-acid residues. The amino acid sequence is identical to that of the pancreas trypsin-inhibitor of Kunitz and Northrop. See Kunitz, M., and Northrup, J. H., J. Gen. Physiol., 19,991 (1936). Both of these polypeptides are the same substance and are referred to by the older name of kallikrein-inactivator. The kallikrein-inactivator is a strongly basic substance.

Up until the time of the present invention, neither kallikrein-inactivator nor Kunitz-inhibitor as such as been obtained in a pure crystallized form. Prior to the present invention, it was known to separate from solutions containing the same, at a pH indicating a low acidity value, kallikrein-inactivator and Kunitz-inhibitor by means of magnesium sulfate or ammonium sulfate. See F. Schultz, H. Kraut, and N. Bhargava, Naturwissenschaften 50, page 375, 1963. The crystal materials obtainable by means of magnesium sulfate or ammonium sulfate process are six-sided prisms containing about 50 percent magnesium sulfate or ammonium sulfate. These previously obtained crystalline materials thus are salts of the free basic polypeptides. If the pure substance is to be obtained, then the salts must first be removed and this can be achieved only after dissolution of the crystals.

It has now been found that novel substantially pure crystalline kallikrein-inactivator which is essentially free of amorphous material and inorganic salts can be obtained by crystallization from a basic solution in accordance with the process of the present invention. The results of the instant invention are altogether unpredictable in view of the fact that no example is known in the literature where a polypeptide having such a high molecular weight as that of the kallikrein-inactivator, i.e., 6,500, would, simply by a change in the pH value, and without the addition of salts, be obtained in a crystalline form. It is furthermore surprising that the kallikrein-inactivator per se remains stable at a pH in excess of 9. It is repeatedly set forth in the literature that the kallikrein-inactivator is unstable in an alkaline medium. Therefore, in the literature it has been recommended to neutralize inactivator solutions since they are susceptible to the pH effects.

The process of the instant invention whereby the novel crystalline KI is prepared comprises as the initial step preparing an aqueous solution of the kallikrein-inactivator materials prepared by the methods previously known in the art. The aqueous solution is then subjected to treatment to raise the pH to a minimum value of about 9 and preferably from about 10 to 11 or above and to achieve a concentration of at least 5,000 KIU/ccm. of solution. The solution is then subjected to treatment, e.g., cooling, standing, seeding, etc., to permit crystallization of the substantially pure KI essentially free of amorphous material from solution.

The process of the instant invention may be applied to any of the KI materials prepared by the previously known processes. In this respect specific attention is directed to the process disclosed in the previously mentioned United States Pat. No. 3,181,997. Such substances may be dissolved in distilled water in the event they are in dry form or in the event an aqueous solution of the KI is the product of the process employed, then such aqueous solution may be directly employed. The most desirable starting materials are the KI materials which have been separated from admixture with impurities. The higher the degree of purity, the greater will be the yield during crystallization. A particularly useful starting material for the crystallization process of this invention is a KI material which has been freed from impurities to the extent that a minimum purity of 10 μg./KIU is attained.

The aqueous solution is prepared in such manner that the concentration of the solution when adjusted to the appropriate pH is at least 5,000 KIU, preferably 100,000 to 1,000,000 KIU per cubic centimeter (KIU/ccm.) of solution. The purity level of the starting material will govern the making up of the appropriately concentrated solutions.

The pH of the solution is then adjusted to a level of at least 9 by the addition of organic or inorganic bases or by the addition of a strongly basic anion exchange resin. The preferred base is ammonia, however, as indicated other basic materials are likewise effective. Exceptionally high yields are obtained when adjusting the pH of the solution to a value of 11 and above with ammonia.

When basic materials other than ammonia are employed, the optimum pH value may differ from that value which is optimum with ammonia. This value may easily be determined for each material by those skilled in the art.

As examples of inorganic bases which can be employed, there may be mentioned soda lye, potassium lye, calcium hydroxide and/or baryta water, i.e., a saturated solution of barium hydroxide, and the like.

As examples of organic bases which may be employed in the process of this invention, there may be mentioned alkyl amines, such as, ethylenediamine, methylamine and trimethylamine and heterocyclic amines, such as piperidine and the like.

In lieu of raising the pH of the solution by addition of an organic or inorganic base, the effect may be accomplished through the employment of a strongly basic anion exchange resin. The resin may be utilized in a packed column and the solution flowed through the column or it may be in a form which is added to the solution and admixed therewith to form a suspension which is then settled. Suitable strongly basic anion exchange resins are well known in the art and by way of example there may be mentioned "Amberlite" IRA–410 (a registered trademark). "Amberlite" designates the trademark for modified, phenolic resins, 100 percent phenolic resins and maleic resin esters for use in various varnishes, enamels and printing inks [manufactured by Rohm and Haas] (see Merck Index, 7th Edition, Merck & Co., Inc., pages 1583–4). "Amberlite" IRA–410 having a particle size of 20 to 30 mesh, loaded with a sodium hydroxide solution is, for example, suitable. "Lewatit" MIH is an example of an additional exchanger which can be employed. "Lewatit" MIH is manufactured by Naftone, Inc. of New York.

When employing an anion exchange resin such as referred to above, the optimum yields of crystalline product appear to result at a pH of between 9 and 10. When employing the inorganic and organic bases to achieve the desired pH, the optimum yields appear as in the case of ammonia to result at about pH 11.

When a neutral or acid solution of the KI is subjected to vacuum concentration, no crystals are obtained. However, when the pH of the aqueous solution is raised in accordance with this invention to a level of 9 or above, and preferably 11 and above, exceptionally high yields of pure KI crystals are obtained.

When the desired pH level is attained, the solution is allowed to stand and crystal formation ensues. A large amount of crystal formation is apparent even after one hour, however, maximum yields are obtained generally after about ten hours. The crystalline substance can be isolated by filtering, sucking off, decanting, centrifuging and subsequently washing and drying the crystals.

As previously indicated, prior to the present invention, pure KI crystals essentially free of amorphous material had not been obtained. The crystals resulting from the process of this invention represent, however, substantially pure KI. The crystals are four-sided prisms. The crystals are ortho-rhombic and belong to space group $P_{2_12_12_1}$. Eventually, one or more sides may become slanted. The crystals are difficultly soluble in water.

The crystals do, however, dissolve easily by lowering the pH rate. It is sufficient, for example, to introduce $CO_2$ into the crystal suspension in order to dissolve it. Under conditions wherein $CO_2$ is absent, it has been found that more than 100 ccm. of water are required at 20° C. in order to dissolve 1 gram of crystals. On the other hand, the solubility of crystals made by the process employing magnesium sulfate or ammonium sulfate is more than 10 percent at this same temperature. The purity of the crystalline material dried over phosphorous pentoxide is about 0.14 microgram (μg.) of material per KIU. A suspension of crystals in water has a pH of about 10.

The novel substantially pure KI crystalline material of this invention is distinctly different from the crystalline KI material previously obtained.

A diagrammatic representation of the salt containing crystalline material previously obtainable is shown in FIG. 1. This diagrammatic representation was prepared from a photomicrograph of KI crystallized from magnesium sulfate at an acid pH of 6. The crystals are hexagonal prisms and they contain about 50 percent magnesium sulfate.

Figure 1A:
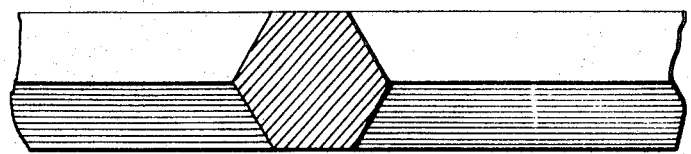

FIG. 1A is a transverse sectional view taken along the line 2—2 of FIG. 1.

Figure 2:
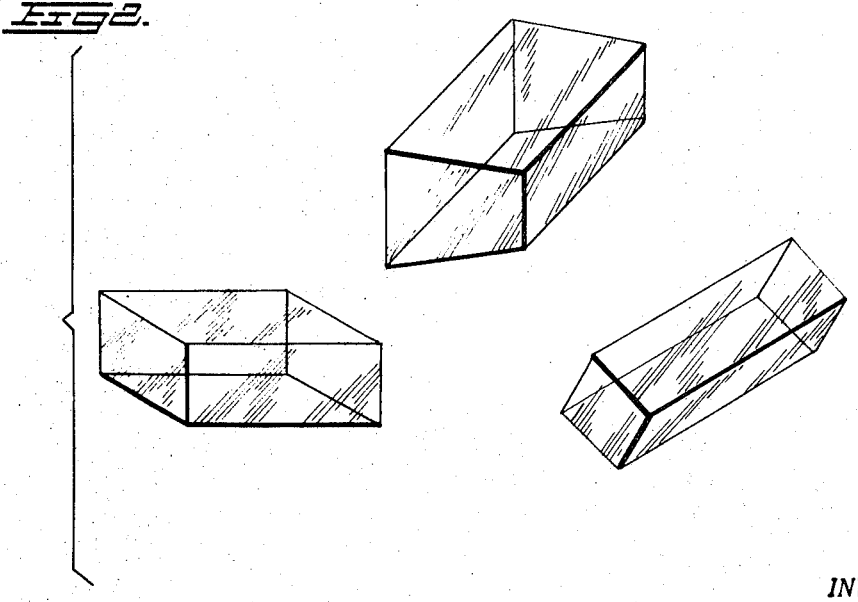

A diagrammatic representation of the novel substantially pure KI crystals of the present invention is shown in FIG. 2. This representation was prepared from a photomicrograph of KI crystals obtained in accordance with the present invention by adjusting the pH of the solution with ammonia. The crystals are four-sided prisms and are substantially pure KI.

A comparison of X-ray photos of KI crystallized from a solution of ammonium sulfate at a pH of 6 with KI crystallized from ammonia solution at a pH of 10 reveals distinct differences between the crystals:

KI CRYSTALLIZED FROM AMMONIUM SULFATE AT pH 6

Crystal morphology:
    Crystal system ____ Monoclinic.
    Form _____ Fragments, twinned.
    Axial ratio _____ Can be calculated from the X-ray data.
    β Angle _____ 62°.
    Cleavage _____ Nonobserved.
X-ray data:
    Cell _____ (a) 28.7 A., (b) 72.3 A., (c) 28.7 A.
    Space group _____ $P_{2_1}$.
    V _____ 52,500 A.³.

KI CRYSTALLIZED FROM AMMONIA SOLUTION AT pH 10

Crystal system _____ Ortho-rhombic.
Form _____ Fragments.
Axial ratio and β angle _ Can be calculated from the X-ray data.
Cleavage _____ Nonobserved.
X-ray data:
    Cell _____ (a) 43.3 A., (b) 49.0 A., (c) 23.3 A.
    Space group _____ $P_{2_12_12_1}$.
    V _____ 49,500 A.³.

Figure 3:
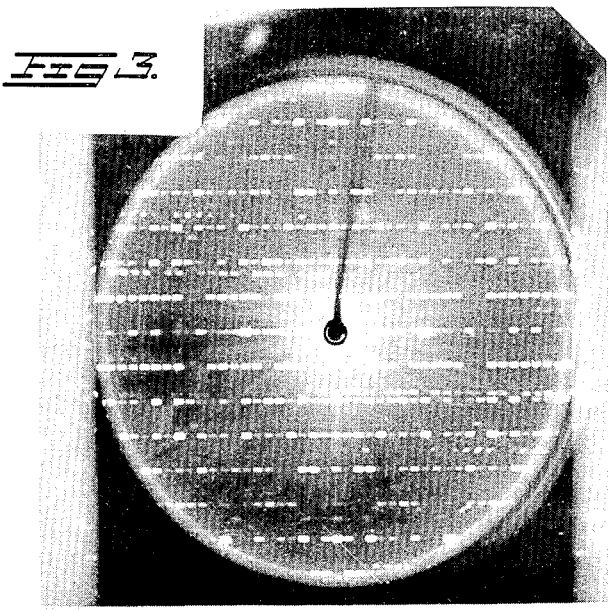
Figure 4:
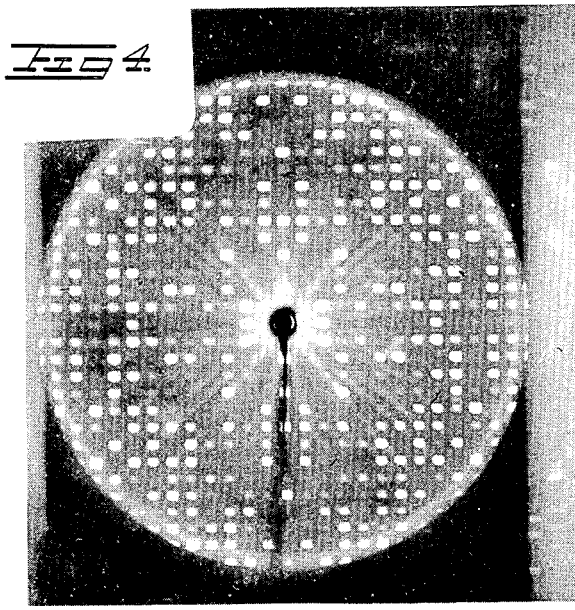

A reproduction of the X-ray photos is presented in FIG. 3 and FIG. 4. The KI crystallized from ammonium sulfate solution at pH 7 is the subject of FIG. 3 while that crystallized from ammonia solution at pH 10 is shown in FIG. 4. A comparison of these X-ray photos demonstrates that those from ammonium sulfate are monoclinic and belong to space group $P_{2_1}$ (FIG. 3) while those of the present invention are ortho-rhombic and belong to space group $P_{2_12_12_1}$.

The two kinds of crystals were kown with respect to their IR- and UV-spectra.

The IR-spectra in FIGS. 5 and 6 were taken with an IR-spectrophotometer made by S. Brückl, München. FIG. 5 shows the prior art kallikrein inactivator while FIG. 6 shows the crystalline compound of this invention. FIG. 7 shows a comparison of the UV spectra.

The lines from shorter to longer wave length show the UV spectra of magnesium sulfate, the prior art kallikrein inactivator and the crystalline kallikrein inactivator according to the present invention.

The first line of the left shows magnesium in a concentration of 1 g./liter. The central line shows the prior art kallikrein inactivator crystallized with magnesium sulfate in a concentration of 0.987 g./liter. The line to the right shows a saturated solution of the kallikrein inactivator of the present invention of a pH of 8.8.

The UV spectra were taken with a spectrometer.

IR spectrum:
  Sufrared spectrophotometer of S. Brückl, Munich.
  Grating—75 grooves/mm.
  Source intensity—3.
  Gain—2.4.
  Suppression—3.
  Scanning speed—200 cm.$^{-1}$/min.
  0.9 mg. of substance are dissolved in 300 mg. of potassium bromide (pellet of a diameter of 13 mm.).

UV spectrum:
  Spectrophotometer (double-beam system) of Perkin-Elmber.
  Model 137 UV 6 No. 179).
  60° quartz prism.
  Hydrogen light source type HF3.
  Scanning speed 25 m$\mu$/min.
  Energy: 60 to 80%.
  Stray light: 1% to 200 m$\mu$.
  Light path: 10.0 mm. (±0.01 mm.) quartz suprasil cuvettes.

A further essential distinction between the crystalline KI of the present invention and that obtainable by previously known means lies in the degree of solubility of each in water. The crystalline material obtained from magnesium sulfate and containing up to 50 percent of the same dissolve quite readily. In contradistinction to this, the crystals of this invention are difficultly soluble in water and may be washed with the same without substantial loss.

The pharmaceutical compositions containing the KI of the present invention permit the reversible inactivation of trypsin, chymotrypsins, fibrinolysin (plasmin) and kallikrein. Thus, a fibrin coagulum, which is dissolved completely by a definite amount of plasmin in less than one minute, is protected from dissolution by this amount of plasmin in the presence of the inactivator for up to 24 hours. The inhibition of the action of the fibrinolysis-promoting enzyme can be shown also on Hartert's thrombelastograph, the fibrinolysis activated by streptokinase being inhibited by the addition of the preparation in accordance with the invention.

Pharmacological testing shows a great therapeutic tolerance. 200–400 KIU/kg. administered intravenously to the narcotized cat does not influence the blood pressure. With substantially higher doses, a drop in blood pressure occurs with good recovery. In the narcotized dog, the effect of the intravenous administration of 200 KIU/kg. on the blood pressure can also not be detected.

Using Langendorff's method on isolated guinea pig hearts, doses of up to 2 KIU are without effect but higher doses cause a temporary slight increase in amplitude and 2,000 KIU causes a temporary stoppage.

The preparation has no effect on isolated guinea pig duodenum and also is ineffective as to the bronchial width in narcotized guinea pigs.

The subcutaneous administration of a 0.5% solution of the preparation causes no irritating effects on rabbit ears.

The general toleration of the preparation is good. Intravenous doses of 20,000–60,000 KIU/kg. are tolerated by white mice without noticeable effect.

The substantially pure KI crystals obtained in accordance with the process of the present invention are, for example, effective in the treatment of pancrease necrosis (cf., for example, E. Asang: "Wandlungen in der Therapie enzundlicher Erkrankungen der Bauch speicheldruse" in Langenbecks Archiv. and Deutsche Zeitschrift fur Chirurgie, volume 293, No. 5, 1960, pp. 645–670).

As is apparent from the foregoing indications concerning pharmaceutical application of the crystalline product of this invention, it is useful in the same manner as the previously known but impure KI substance as disclosed for example in U.S. Patent No. 3,181,997 previously referred to, in the paragraphs bridging columns 8 and 9, which is incorporated herein by reference. In view of the low solubility of the substance, it will remain in the abdomen cavity a longer period of time. Furthermore, the new crystalline product can be used in the form of a depot suspension.

The invention is illustrated by the following examples but it is not limited thereto.

EXAMPLE I 4.48 grams of a lyophylized kallikrein-inactivator with a purity level of 0.16 $\mu$g./KIU equaling 28 mega KIU is dissolved in 56 ccm. of redistilled water; 1 ccm. of solution then contains 500,000 KIU.

To this solution 56 cm. pure 25% ammonia is introduced.

After 24 hours standing at 20° C. a thick crystal paste has formed which is then passed through a coarse filter; it is washed with 19 ccm. of distilled water and vacuum dried over posphorous pentoxide.

The yield is 3.096 grams of crystals equalling 22.12 mega KIU having a purity of 0.14 $\mu$g./KIU. This represents a yield of 79% based upon the total KIU present in the starting material.

EXAMPLE II 20 ccm. of kallikrein-inactivator solution having a purity of 0.16 $\mu$g./KIU and equal to 2 mega KIU are combined with 0.63 ccm. saturated baryta water.

After standing for 10 hours at 4° C. the crystals formed are filtered over coarse filter paper, washed with water and vacuum dried over phosphorous pentoxide. The yield is 129 mg. of crystals, equalling 920,000 KIU. This in turn equals 46% of the purest grade of 0.14 $\mu$g./KIU based upon the total KIU present in the starting material.

EXAMPLE III 0.48 gram of kallikrein-inactivator having a purity of 0.16 $\mu$g/KIU are dissolved in 30 ccm. of water and 0.39 ccm. ethylene-diamine are added. After a period of 15 minutes the crystallization begins. After 24 hours a crystal paste is obtained, it is separated, washed with a little water and dried. 239 mgr. of crystals are obtained with a purity of 0.142 $\mu$g./KIU. This represents a yield of 56%.

EXAMPLE IV 1 gram of a lyophylized kallikrein-inactivator with a purity of 0.2 µg./KIU equalling 5 mega KIU is dissolved in 10 ccm. distilled water. To this solution 0.6 ccm. concentrated ammonia is added. After 24 hours at a temperature of 4° C. the crystals are filtered, washed and dried. 210 mgr. of crystals are obtained having a 0.15 µg./KIU purity degree. This would mean a 28% yield.

EXAMPLE V 3.4 grams lyophylized kallikrein-inactivator with a purity of 0.17 µg./KIU are dissolved in 150 ccm. water. The pH value is 6.5. Upon dissolution, 50 ccm. of a strongly basic anion-exchange Amberlite IRA 410 is added. The suspension is stirred to 10 minutes and left standing undisturbed for 24 hours. The suspension shows then a pH of 10.5. By suspension and straining the crystal suspension is separated from exchangers, the crystals filtered out, washed in little water and dried. 2.03 grams of crystals with a purity of 0.145 µg./KIU are obtained, meaning a 70% yield.

EXAMPLE VI 15.4 liter of a strong acid sollution of the kallikrein-inactivator having a purity of 0.16 µg./KIU thus containing 295 million KIU are left to flow for 6 hours through an exchange column, which is reinforced with 5 liters of a strongly basic anion-exchange Amberlite IRA 410. The strongly basic solution obtained is cut down in a rotary vacuum vaporizer to 1.5 liter. During concentration the solution begins to crystallize and finally yields 71% of the total volume of the kallikrein-inactivator in a crystallized form.

What is claimed is:

1. Substantially pure crystalline kallikrein-inactivator essentially free from amorphous material and inorganic salts, being of polypeptide structure and having a molecular weight of about 6,500 and, in addition, having a purity level of at least 0.18 µg./KIU, said crystals being four-sided prisms at least one of which may be slanted, being rhombic and belonging to space group $P_{2_1 2_1 2_1}$ and a suspension of said crystals in water yielding a solution having a pH of about 10.

2. A pharmaceutical composition comprising a pharmaceutically effective amount of substantially pure crystalline kallikrein inactivator as defined in claim 1 in intimate admixture with a pharmaceutical carrier.

3. A method for preventing adhesions which comprises introducing into the abdominal cavity during an operation, crystalline kallikrein inactivator of claim 1 in the form of a powder.

4. A method for preparing substantially pure crystalline kallikrein-inactivator essentially free of amorphous material and inorganic salts which comprises preparing an aqueous solution of a kallikrein-inactivator preparation containing at least 5,000 KIU/ccm. of solution, adjusting the pH of the solution by admixture with at least one member selected from the group consisting of organic and inorganic bases and strongly basic anion exchange resins to a pH value of at least 9 and while maintaining a pH above 9, crystallizing out and recovering the substantially pure crystalline kallikrein-inactivator.

5. A method as in claim 4 wherein ammonia is employed to adjust the pH to about 11.

6. A method as in claim 4 wherein the kallikrein-inactivator preparation contains from 100,000 to 1,000,000 KIU/ccm. of solution.

7. A method for the preparation of substantially pure crystalline kallikrein-inactivator essentially free of amorphous material and inorganic salt which comprises preparing crystalline material containing about 50 percent kallikrein-inactivator and about 50 percent of at least one member of the group consisting of magnesium sulfate and ammonium sulfate, preparing an aqueous solution of such crystalline material containing at least 5,000 KIU per cubic centimeter of solution, adjusting the pH of such solution to a value of at least 9 by the admixture with at least one member selected from the group consisting of organic and inorganic bases and strongly basic anion exchange resins, and while maintaining such pH crystallizing and recovering the substantially pure crystalline kallikrein-inactivator from solution.

References Cited
UNITED STATES PATENTS

| | | | |
|---|---|---|---|
| 2,890,986 | 6/1959 | Kraut | 167—74 |
| 3,073,747 | 1/1963 | Reid | 167—74X |
| 3,181,997 | 5/1965 | Schultz | 424—95 |

SAM ROSEN, Primary Examiner

U.S. Cl. X.R.

260—112.5; 424—95, 110

UNITED STATES PATENT OFFICE
CERTIFICATE OF CORRECTION

Patent No. 3,558,773       Dated January 26, 1971

Inventor(s) Fritz Schultz

It is certified that error appears in the above-identified patent and that said Letters Patent are hereby corrected as shown below:

Column 1, Line 29, "kalliķrien" should be -- kallikrein --.
Column 1, Line 35, "kallikrien" should be -- kallikrein --.
Column 5, Line 9, "kown" should be -- known --.
Column 5, Line 47, "to" should be -- by --.
Column 6, Line 29, insert after "herein by reference." -- In addition, however, the crystals of the invention demonstrate essentially new possibilities of application. Due to their low solubility one can easily employ them in the form of powder. Such powder can be introduced into the abdomen cavi during an operation in order to prevent adhesions. --
Column 6, Line 43, "cm" should be -- ccm. --.
Column 6, Line 48, "posphorous" should be -- phosphorous --.

Signed and sealed this 24th day of October 1972.

(SEAL)
Attest:

EDWARD M. FLETCHER, JR.
Attesting Officer

ROBERT GOTTSCHALK
Commissioner of Patent